US009658427B2

(12) United States Patent
Bullard et al.

(10) Patent No.: US 9,658,427 B2
(45) Date of Patent: May 23, 2017

(54) REACTION COMPENSATED TILT PLATFORM

(71) Applicant: Raytheon Company, Waltham, MA (US)

(72) Inventors: Andrew L. Bullard, Waltham, MA (US); Islam Shawki, Waltham, MA (US)

(73) Assignee: Raytheon Company, Waltham, MA (US)

( * ) Notice: Subject to any disclaimer, the term of this patent is extended or adjusted under 35 U.S.C. 154(b) by 270 days.

(21) Appl. No.: 13/841,353

(22) Filed: Mar. 15, 2013

(65) Prior Publication Data

US 2014/0268383 A1    Sep. 18, 2014

(51) Int. Cl.
  *G02B 7/182*  (2006.01)
  *G02B 26/08*  (2006.01)
  *G02B 26/10*  (2006.01)
  *F16M 11/18*  (2006.01)

(52) U.S. Cl.
  CPC ............. *G02B 7/182* (2013.01); *F16M 11/18* (2013.01); *G02B 7/1821* (2013.01); *G02B 26/085* (2013.01); *G02B 26/101* (2013.01)

(58) Field of Classification Search
  CPC .... G02B 7/182; G02B 7/1821; G02B 26/085; G02B 26/101; F16M 11/06–11/128; F16M 11/18
  See application file for complete search history.

(56) References Cited

U.S. PATENT DOCUMENTS

| 4,175,550 | A | * | 11/1979 | Leininger ..................... 5/109 |
| 4,732,440 | A | * | 3/1988 | Gadhok .............. G02B 7/1821 359/214.1 |
| 5,110,195 | A | | 5/1992 | Loney |
| 6,837,587 | B1 | | 1/2005 | Hughes |
| 6,856,437 | B2 | | 2/2005 | Witt et al. |

(Continued)

FOREIGN PATENT DOCUMENTS

| EP | 1321822 A1 | 6/2003 |
| JP | 02-051121 | 2/1990 |
| JP | 2006-068688 | 3/2006 |

OTHER PUBLICATIONS

Ball Aerospace; Ball Aerospace Delivers 500 Tactical Fast Steering Mirrors for Guardian Program; Ball Aerospace News Release; Dec. 9, 2008; 2 pages; Ball Aerospace.

(Continued)

*Primary Examiner* — Joseph P Martinez
*Assistant Examiner* — Cara Rakowski

(57) ABSTRACT

A reaction compensated tilt platform assembly comprises a support base, and a reaction mass, pivotally coupled to the support base. A tilt platform which can function as or support a mirror is pivotally coupled to the support base. At least two linear actuator coil assemblies are carried by the reaction mass. At least two linear actuator magnet assemblies are carried by the tilt platform and are disposable within the at least two linear actuator coil assemblies. The linear actuator magnet assemblies taper from a larger diameter toward a center of the magnet assembly to a smaller diameter toward an end of the magnet assemblies. Actuation of the linear actuator magnets results in pivotal movement of the tilt platform relative to the reaction mass.

13 Claims, 3 Drawing Sheets

(56) References Cited

U.S. PATENT DOCUMENTS

| | | | |
|---|---|---|---|
| 7,009,752 B1 | 3/2006 | Lorell et al. | |
| 2004/0245864 A1* | 12/2004 | Bailey | 310/15 |
| 2009/0302251 A1* | 12/2009 | Caldwell | F02M 51/0635 |
| | | | 251/129.15 |
| 2012/0320596 A1* | 12/2012 | Hastings | F16M 11/121 |
| | | | 362/259 |

OTHER PUBLICATIONS

Ball Aerospace & Technologies Corp.; Fast Steering Mirrors; http://web.archive.org/web/20110104192032/http://www.ballaerospace.com/page.jsp?page= . . . ; archived online Jan. 4, 2011; 1 page; Ball Aerospace.
Ball Aerospace & Technologies Corp.; Wide Angle Steering Mirror; Ball Aerospace brochure; Aug. 2010; 2 pages; Ball Aerospace & Technologies Corp.
C-Flex Bearing Co., Inc.; The Bearing Solution—Frictionless, Low Hysterias Bearing for Angular Applications; C-Flex Bearing Co. brochure; Mar. 22, 2011; 5 pages; C-Flex Bearing Co., Inc.
Left Hand Design Corporation; Fine Steering Mirrors; http://web.archive.org/web20110627163936/http://lefthand.com/prod_fsm.aspx ; archived online Jun. 27, 2011; 2 pages; Left Hand Design Corporation.
Optics in Motion; Fast Steering Mirror—Models OIM3300; User's Manual; Apr. 2, 2007; 11 pages; Revision B; Optics in Motion.
PCT application PCT/US2014/011684; filing date Jan. 15, 2014; Raytheon Company; Partial International Search Report mailed Apr. 2, 2014.
PCT application pCT/US2014/011684; filing date; Jan. 15, 2014; Raytheon Company; International Search Report mailed Jun. 4, 2014.
Berta et al, "Development of a Commercial Line of High-Performance, Fast-Steering Mirrors", Ball Aerospace & Technologies Corp., Jul. 1999, 12 pages.
Henderson, "Commercial Fast Steering Mirrors", Optics in Motion LLC, Sep. 2009, 12 pages.
Jianmin et al, "Research on Shaftless Fast-Steering Mirror Used in a Precision Tracking-Aiming System", $3^{rd}$ International Symposium on Advanced Optical Manufacturing and Testing Technologies: Large Mirrors and Telescopes, 2007, vol. 6721, 6 pages.
Kaplan, "Fast Steering Mirror Performance Measurements", United Technologies Optical Systems Inc., Jun. 2011, vol. 1920, 12 pages.
Loney, "Design and performance of a Small Two-Axis High-Bandwidth Steering Mirror", Beam Deflection and Scanning Technologies, 1991, vol. 1454, 9 pages.
Meline et al, "Universal Beam Steering Mirror Design Using the Cross Blade Flexure", Acquisition, Tracking, and Pointing VI, 1992, vol. 1697, 19 pages.
Morgan et al, "Large, High Performance, Fast Steering Mirrors with FPGA-Embedded Controls", Advanced Wavefront Control: Methods, Devices, and Applications, 2009, vol. 7466, 10 pages.
Shen et al, "Large Angle Fast Steering Mirrors", Active and Adaptive Optical Components, 1991, vol. 1543, 8 pages.
Sweeney et al, "Design Considerations for Fast Steering Mirrors (FSM's)", Axsys Technologies Imaging Systems, 11 pages.
Tapos et al, "High Bandwidth Fast Steering Mirror", Optomechanics, 2005, vol. 5877, 14 pages.
Wu et al, "High-Powered Voice Coil Actuator for Fast Steering Mirror", Optical Engineering, Feb. 2011, vol. 50, No. 2, pp. 5.

\* cited by examiner

REACTION COMPENSATED TILT PLATFORM

BACKGROUND OF THE INVENTION

Field of the Invention

The present invention relates generally to the field of optical communication systems. More particularly, the present invention relates to reaction compensated steering mirrors for use in free-space optical communication systems.

Related Art

Various conventional beam steering mirrors and fast steering mirrors have been developed over the years to address perceived needs in optical communication systems. While some of these attempts utilize reaction torque-compensated steering mirrors, these prior art devices generally provide very limited angular travel. Also, such prior art devices are usually limited by their support flexures and linear actuators.

While some two-axis scanning or steering mirrors have been developed that provide larger angular travel, these prior art solutions provide lower precision, lower servo bandwidth, higher jitter/noise, and often do not provide reaction torque compensation.

SUMMARY OF THE INVENTION

In accordance with one aspect of the invention, a reaction compensated tilt platform assembly is provided, including: a support base, and a reaction mass, pivotally coupled to the support base. A tilt platform which can function as or support a mirror can be pivotally coupled to the support base. At least two linear actuator coil assemblies can be carried by one of the reaction mass or the tilt platform. At least two linear actuator magnet assemblies can be carried by another of the tilt platform or the reaction mass and can be disposable within the at least two linear actuator coil assemblies, the linear actuator magnet assemblies tapering from a larger diameter toward a center of the magnet assembly to a smaller diameter toward an end of the magnet assemblies. Actuation of the linear actuator magnets results in pivotal movement of the tilt platform relative to the reaction mass.

In accordance with another aspect of the invention, a reaction compensated tilt platform assembly is provided, including a support base and a reaction mass, pivotally coupled to the support base. A tilt platform can be pivotally coupled to the reaction mass. At least one electronic flexure ribbon can be coupled to the support base and the reaction mass, the at least one electronic flexure ribbon extending through the reaction mass and being oriented in a first configuration when entering the reaction mass and being oriented in a second configuration when exiting the reaction mass, the second configuration being orthogonal to the first configuration.

In accordance with another aspect of the invention, a reaction compensated tilt platform assembly is provided, including a support base and a reaction mass, pivotally coupled to the support base. A tilt platform can be pivotally coupled to the support base. A locking pin can be engageable with at least the tilt platform and/or the reaction mass. Activation of the locking pin in a single degree of movement can limit movement of the tilt platform relative to the base in two degrees of freedom and limit movement of the reaction mass relative to the base in two degrees of freedom.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
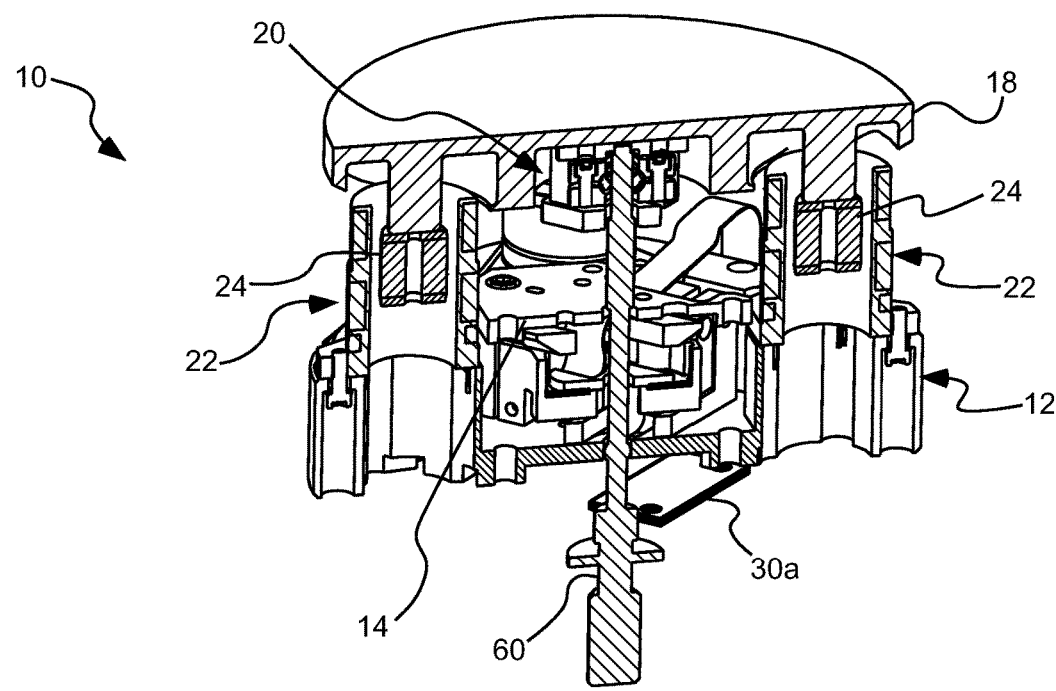
FIG. 1 is a perspective, sectioned view of a reaction compensated tilt platform assembly in accordance with an embodiment of the invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

DEFINITIONS

As used herein, the singular forms "a" and "the" can include plural referents unless the context clearly dictates otherwise. Thus, for example, reference to "a voice coil actuator" can include one or more of such actuators.

As used herein, the terms "attached," "coupled," fixed, " etc., can be used to describe a condition in which two or more components are coupled to one another in such a manner that they function as intended: that is, the force required to uncouple the components is sufficiently large such that the components will remain attached to one another during the service for which they were designed. In some embodiments of the invention, various components can be "permanently" coupled to one another: in such a case, the components are coupled to one another such that some deformation of one or both of the components, or the fasteners used to couple the components, will occur if the components are uncoupled from one another. One example of such a coupling can occur when two or more components are bonded or otherwise adhered to one another.

In other aspects, various components can be removably coupled to one another such that they can be separated without causing permanent deformation of the components, or the fasteners used to couple the components. One example of such a coupling can occur when two or more components are bolted to one another (in which case, removal of nuts coupled to bolts can result in uncoupling of the components without damaging the nuts or the bolts).

As used herein, the term "ribbon" is to be understood to refer to a geometry of an electronic flexure, or connector, that includes a width that is significantly larger than is its thickness. In one embodiment, the electronic flexure ribbons are at least about 5 times as wide as they are thick.

Directional terms, such as "vertical," "horizontal," "upper," "lower," etc., are used herein to describe relative positions of various components. It is to be understood that such usage is an effort to most clearly describe, and, where applicable, claim, the features of the invention and is not be to limiting unless the context clearly indicates otherwise. Such directional terms are used in a manner that will be readily understood by one of ordinary skill in the art having possession of this disclosure.

As used herein, the term "substantially" refers to the complete or nearly complete extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

INVENTION

The present technology can utilize a novel arrangement of cross-blade flexures, voice coil actuators, differential gap sensors, a locking pin, and flex-circuit to simultaneously provide numerous advantages in a pointing assembly. One exemplary use of the system is in a fast moving steering mirror ("FSM").

The technology can utilize two-axis pivot flexure assemblies that can be configured to allow a locking pin to engage and lock both the tilt platform and reaction mass, while allowing the required angular travel when the lock is disengaged. Voice coil actuators can be configured to allow large angular movement as well as linear stroke between the coil and magnet assemblies. The pole pieces of the actuators can be tapered to increase the angular travel while preserving performance. Their location with respect to the pivot flexure assemblies can be optimized to maximize travel and simultaneously balance the tilt platform and reaction mass. Because the actuator coils can be mounted on a moving reaction mass, current can be delivered to them in a low-hysteresis, high-reliability method, which can be accomplished with a custom flex-circuit integrated into the pivot flexure assembly for the reaction mass in a manner that doesn't interfere with the locking pin.

Figure 3:
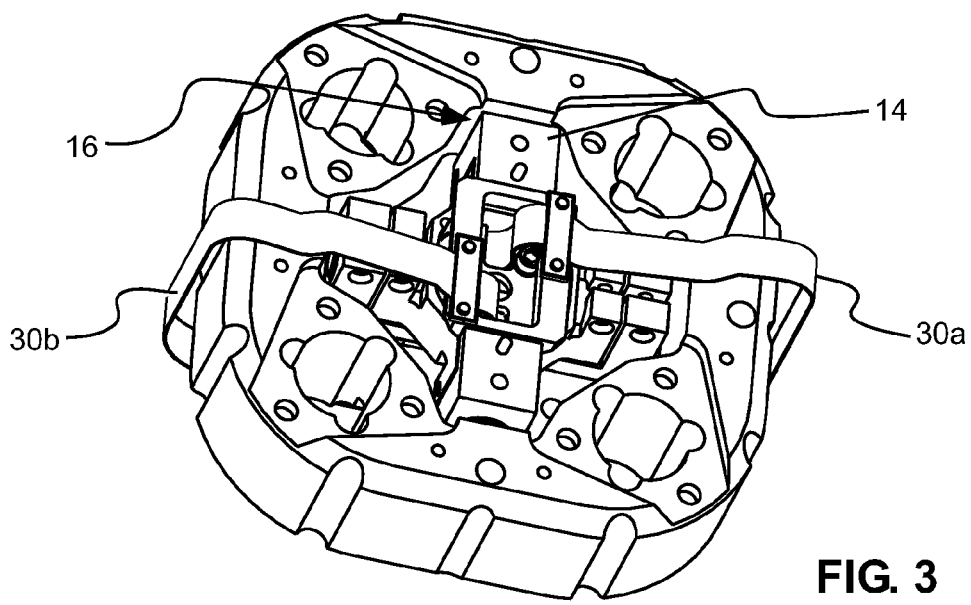
FIG. 3 is a perspective view of the assembly of FIG. 1.

Turning now to the figures, specific exemplary features of a reaction compensated steering mirror assembly 10 are shown. The assembly can generally include a support base 12 and a reaction mass 14 (shown more clearly in FIG. 3). The reaction mass can be pivotally coupled to the support base by way of pivot couplers 16 (FIG. 3). A tilt platform 18 can be pivotally coupled to the support base by way of, for example, a pivot coupling assembly 20. At least two linear actuator coil assemblies 22 can be carried by the reaction mass. At least two linear actuator magnet assemblies 24 can be carried by the tilt platform. The magnet assemblies can be disposable within the at least two linear actuator coil assemblies. In operation, actuation of the linear actuator magnets results in pivotal movement of the tilt platform relative to the reaction mass. Thus, while the tilt platform is pivotally coupled to the support base, actuation of the magnet assemblies within the actuator coil assemblies causes the tilt platform to move relative to the reaction mass (e.g., to "push" against the reaction mass).

The present invention can thus provide a mechanism for providing precision pointing capability with high servo bandwidth, high precision, and reduced reaction forces and torques. The present technology can provide an angular travel of several degrees in two axes and extremely low jitter, and can include an integral single degree-of-freedom tilt lock. The technology has been found particularly effective as a platform to support a mirror for line-of-sight scanning and stabilization or other precision pointing uses. All of these features are presented in a compact, highly efficient mechanism.

Figure 2:
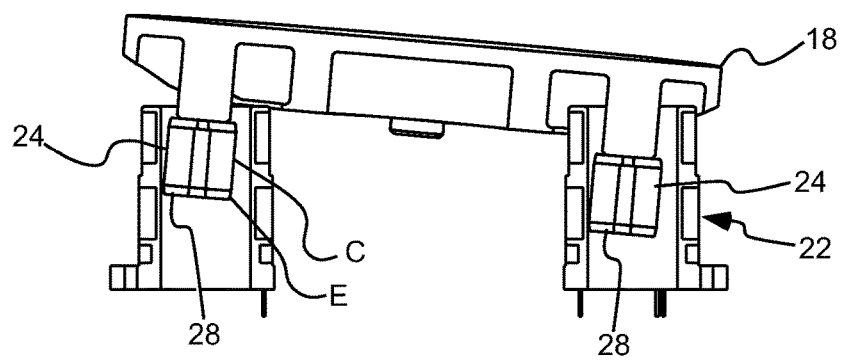
FIG. 2 is a sectioned view of a tilt platform assembly and a pair of magnet actuator assemblies in accordance with an embodiment of the invention, with the tilt platform assembly shown in a tilted configuration relative to the support base.

As shown most clearly in FIG. 2, in one aspect of the invention, the linear actuator magnet assemblies 24 can taper from a larger diameter toward a center or midsection "C" of the magnet assembly to a smaller diameter toward an end "E" of the magnet assemblies. Thus, while the magnet portion of the magnet assemblies can include a generally continuous, cylindrical cross section, the end portions can taper to a smaller diameter. While the manner in which the taper can be provided to the magnets can vary, in one aspect the actuator magnet assemblies 24 can include tapered end caps 28 to provide the taper to the magnet portion.

In this manner, the magnet assemblies 24 can be capable of greater linear travel within the coil assemblies 22. In one embodiment of the invention, the tilt platform 18 can be tilted relative to the support base 12 (not shown in FIG. 3) from an angle of about 0 degrees to an angle of at least about 6 degrees.

In the example shown in the figures, the linear actuator magnet assemblies 24 are coupled directly to the tilt platform 18. In this manner, the WFE (wave front error) induced in a mirror coupled to the tilt platform (or formed integrally with or as the tilt platform) can be greatly minimized.

While not so required, in one embodiment of the invention, one or more electronic flexure ribbons (or flex ribbons) 30a, 30b can be used to provide electronic signals to the various components of the assembly 10. In one aspect, the flex ribbons 30a, 30b can be coupled to the support base 12 and also to one of the reaction mass 14 or the tilt platform 18. The electronic flexure ribbon can extend through the reaction mass 14 and can be oriented in a first configuration when entering the reaction mass and can be oriented in a second configuration when exiting the reaction mass. The second configuration can be orthogonal to the first configuration.

Figure 4:
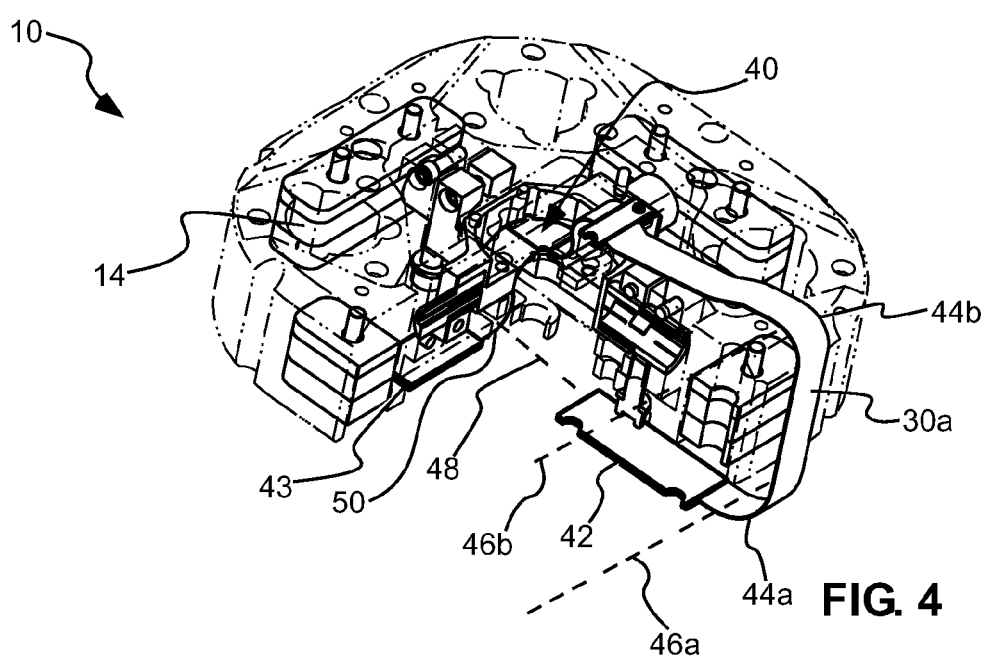
FIG. 4 is a partially sectioned perspective view of the assembly of FIG. 1.

This aspect of the invention is best illustrated in FIG. 4, where flex ribbon 30a is shown, in this example, configured to be coupled to the support base 12 (not shown in FIG. 4), at the bottom-right portion of FIG. 4. The flex ribbon then extends outwardly from the support base, and upwardly around and into the reaction mass. As shown at reference 40, the flex ribbon can include a 90 degree bend formed therein that allows the flex ribbon to be turned orthogonally as it approaches the coupling location to the reaction mass 14. Thus, the ribbon can be clamped or otherwise coupled to the support base at reference 42 in a first configuration, and can be clamped or otherwise coupled to the reaction mass in a second configuration 43 that is orthogonal to the first configuration.

In this manner, the flex ribbons can be subject to bending loads that are much less damaging to the flex ribbons. For example, the turns 44a, 44b shown in FIG. 5 can be subject to bending about parallel axes 46a, 46b that correspond to natural loading stresses for the configuration shown. Axis 48, on the other hand, is orthogonal to axes 46a, 46b, and bending of the ribbon about axis 48 near bends 44a, 44b would cause premature failure of the flex ribbon. However, because the flex ribbon is "turned" 90 degrees within the assembly (at reference 40), the bending forces near turns 44a, 44b are primarily about axes 46a, 46b, while the bending forces near turn 50 are primarily about axis 48. In this manner, out of plane stresses on the flex ribbon are greatly minimized, resulting in better performance by and greater longevity of the ribbon.

In the case that a plurality of flex ribbons 30a, 30b are utilized, they can be coupled to the reaction mass symmetrically about a center of the reaction mass. This can further increase the life of the flex ribbons, and can aid in providing balanced motion about the center of the overall assembly.

In addition to the illustrated example in which the flex ribbons are coupled to the reaction mass, the flex ribbons can alternately be coupled to the tilt platform. In this case, the tilt platform can be energized in addition to, or as well as, the reaction mass. In this embodiment, the flex ribbons can be coupled to the tilt platform symmetrically about a center of the tilt platform.

Figure 5:
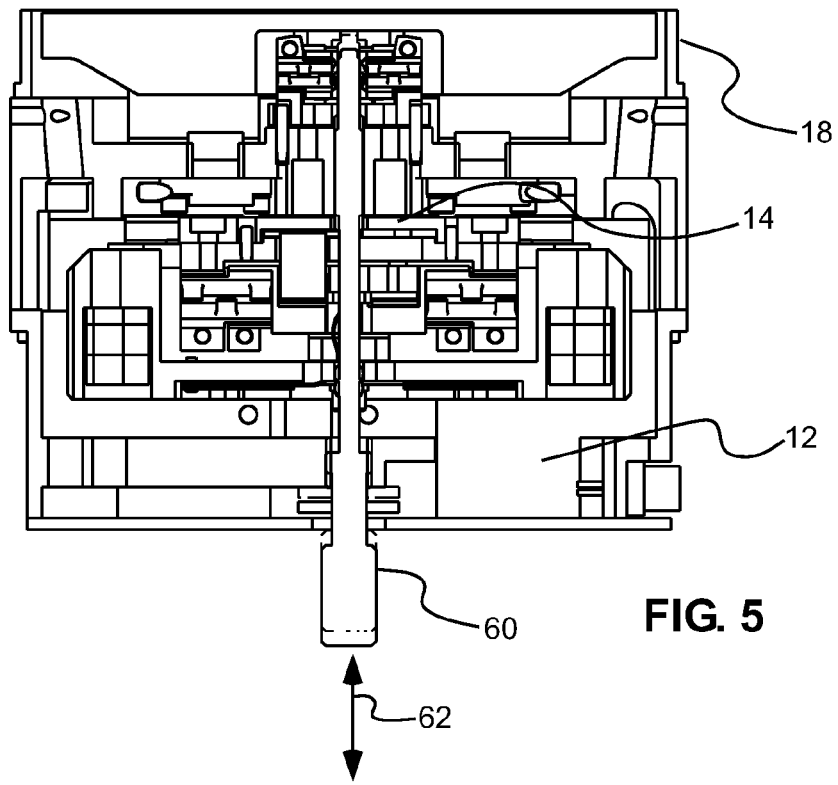
FIG. 5 is sectioned view of the assembly of FIG. 1 in accordance with another aspect of the invention.
Figure 6:
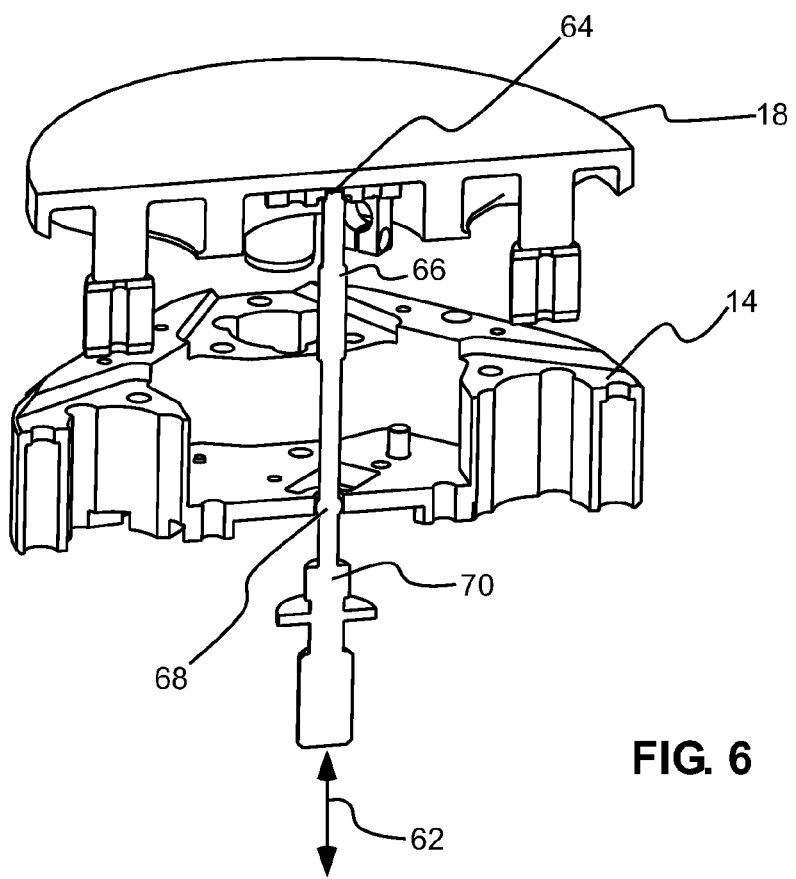
FIG. 6 is a more detailed, sectioned view of the assembly of FIG. 1.

FIGS. 5 and 6 illustrate another aspect of the invention in which a locking pin 60 can be engageable with at least the support base 12 and one or both of the reaction mass 14 or the tilt platform 18. In this example, activation of the locking pin in a single degree of movement (e.g., along direction 62 in FIGS. 5 and 6) can limit movement of the tilt platform relative to the reaction mass or the base in two degrees of freedom. In the example shown in FIG. 6, the locking pin 60 is engageable with each of the tilt platform, the reaction mass and the base. In this case, activation of the locking pin in a single degree of movement limits movement of each of the tilt platform and the reaction mass relative to the base in two degrees of freedom.

In FIG. 5, the pin 60 is shown in an engaged, or locked, position by the dashed line, and in a disengaged, or unlocked position in the solid line. While not so required, the locking pin can be positioned through a geometric center of the overall assembly, to better balance the loads required to lock or fix the components relative to one another when the locking pin is engaged.

FIG. 6 illustrates operation of the locking pin with much of the surrounding structure removed for clarity. The locking pin can include various engagement sections 64, 66, 68, 70 that can engage various components of the overall assembly to fix or lock the components relative to one another. When the pin is in the unlocked position (e.g., the position shown by the solid line in FIG. 5), the engagement portions do not engage components of the assembly. However, when moved into the locked position (e.g., the position shown by the dashed line in FIG. 5), sections 64 and 66 engage surrounding portions of the tilt platform 18; section 68 engages surrounding portions of reaction mass 14; and section 70 engages surrounding portions of base 12 (note that the surrounding engagement structure is omitted from this view for clarity).

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

The invention claimed is:

1. A reaction compensated tilt platform assembly, comprising:
    a support base;
    a reaction mass, pivotally coupled to the support base;
    a tilt platform, pivotally coupled to the support base;
    at least two linear actuator coil assemblies, carried by the reaction mass; and
    at least two linear actuator magnet assemblies, carried by the tilt platform and being disposable within the at least two linear actuator coil assemblies,
    wherein actuation of the linear actuator magnet assemblies results in pivotal movement of the tilt platform relative to the reaction mass, and wherein the linear actuator magnet assemblies have opposing tapered end portions that interface with interiors of the coil assemblies and provide mechanical limits to the pivotal movement of the tilt platform relative to the reaction mass, the tapered end portions tapering from a larger diameter toward a center of the magnet assemblies to smaller diameters toward opposing ends of the magnet assemblies to facilitate angular travel of the magnet assemblies within the coil assemblies.

2. The assembly of claim 1, wherein the linear actuator magnet assemblies include a cylindrical midsection.

3. The assembly of claim 1, wherein the linear actuator magnet assemblies each comprise a magnet portion having tapered end caps, the tapered end caps comprising the opposing tapered end portions of the linear actuator magnet assemblies.

4. The assembly of claim 3, wherein a magnet portion of the linear actuator magnet assemblies includes a cylindrical shape.

5. The assembly of claim 1, wherein the tilt platform can be tilted relative to the support base from an angle of about 0 degrees to an angle of at least about 6 degrees.

6. The assembly of claim 1, wherein the linear actuator magnet assemblies are coupled directly to the tilt platform.

7. The assembly of claim 1, further comprising at least one electronic flexure ribbon, coupled to the support base and one of the reaction mass or the tilt platform.

8. The assembly of claim 7, wherein the at least one electronic flexure ribbon comprises first and second electronic flexure ribbons, each coupled to the support base and one of: the reaction mass or the tilt platform, and each being coupled to the support base in a first configuration and to the reaction mass or the tilt platform in a second configuration that is orthogonal to the first.

9. The assembly of claim 8, wherein the first and second electronic flexure ribbons are coupled to the reaction mass symmetrically about a center of the reaction mass.

10. The assembly of claim 7, wherein the at least one electronic flexure ribbon includes an orthogonal bend formed therein, the orthogonal bend redirecting conductors of the electronic flexure ribbon at an angle of about 90 degrees.

11. The assembly of claim 1, further comprising a locking pin engageable with the tilt platform, wherein activation of the locking pin in a single degree of movement limits movement of the tilt platform relative to the base in two rotational degrees of freedom.

12. The assembly of claim 11, wherein the locking pin is positioned through a geometric center of the reaction compensated tilt platform assembly.

13. The assembly of claim 1, further comprising a locking pin engageable with the tilt platform and the reaction mass, wherein activation of the locking pin in a single degree of movement limits movement of both the tilt platform and the reaction mass relative to the base in two rotational degrees of freedom.

* * * * *